US008122088B2

(12) United States Patent
Banatwala

(10) Patent No.: US 8,122,088 B2
(45) Date of Patent: Feb. 21, 2012

(54) ADDING PERSONAL NOTE CAPABILITIES TO TEXT EXCHANGE CLIENTS

(75) Inventor: Mustansir Banatwala, Hudson, NH (US)

(73) Assignee: International Business Machines Corporation, Armonk, NY (US)

( * ) Notice: Subject to any disclaimer, the term of this patent is extended or adjusted under 35 U.S.C. 154(b) by 930 days.

(21) Appl. No.: 11/769,906

(22) Filed: Jun. 28, 2007

(65) Prior Publication Data
US 2009/0006547 A1  Jan. 1, 2009

(51) Int. Cl.
*G06F 15/16* (2006.01)
(52) U.S. Cl. ......... 709/206; 709/204; 709/205; 709/207
(58) Field of Classification Search .................. 709/204, 709/205, 206, 207
See application file for complete search history.

(56) References Cited

U.S. PATENT DOCUMENTS

| 6,728,784 | B1* | 4/2004 | Mattaway | 709/245 |
| 2002/0131565 | A1* | 9/2002 | Scheuring et al. | 379/88.19 |
| 2003/0163525 | A1 | 8/2003 | Hendricks et al. | |
| 2004/0049543 | A1* | 3/2004 | Kaminsky et al. | 709/204 |
| 2004/0122898 | A1* | 6/2004 | Srinivasa | 709/205 |
| 2004/0181592 | A1* | 9/2004 | Samra et al. | 709/220 |
| 2005/0027800 | A1* | 2/2005 | Erickson et al. | 709/204 |
| 2005/0034079 | A1* | 2/2005 | Gunasekar et al. | 715/753 |
| 2005/0038788 | A1 | 2/2005 | Dettinger et al. | |
| 2006/0026502 | A1* | 2/2006 | Dutta | 715/511 |
| 2006/0080432 | A1* | 4/2006 | Spataro et al. | 709/224 |
| 2007/0237318 | A1* | 10/2007 | McGary | 379/114.15 |
| 2007/0239839 | A1* | 10/2007 | Buday et al. | 709/208 |
| 2007/0288580 | A1* | 12/2007 | Kaminsky et al. | 709/206 |
| 2008/0045184 | A1* | 2/2008 | Randall et al. | 455/412.2 |
| 2010/0185733 | A1* | 7/2010 | Hon et al. | 709/205 |

OTHER PUBLICATIONS

EMC, "EROOM", 2001, pp. 1-60.*

* cited by examiner

*Primary Examiner* — Karen Tang
(74) *Attorney, Agent, or Firm* — Patents on Demand P.A.; Brian K. Buchheit; Scott M. Garrett

(57) ABSTRACT

The present invention discloses a personal note capability for a text exchange client. A personal note can be a note not transmitted in a dialog between text exchange participants. It can, however, be transmitted in a communication outside the text exchange dialog communication. The personal note can be created and presented within a text exchange window. In one implementation, a user can utilize a special symbol to denote that a personal note follows. For example, a user could enter ":: subject globalization program," into a text output field, where "::" is the special symbol, "subject" denotes a category of the personal note, and "globalization program" defines the subject of the text exchange. Personal notes can be stored along with a log of the communication session and used for indexing, searching, and other log management functions.

19 Claims, 4 Drawing Sheets

ADDING PERSONAL NOTE CAPABILITIES TO TEXT EXCHANGE CLIENTS

BACKGROUND

1. Field of the Invention

The present invention relates to the field of text exchange technologies and, more specifically, to adding personal note capabilities to text exchange clients.

2. Description of the Related Art

In physical meeting rooms, participants often record pen-on-paper notes concerning items of import and/or follow-up actions that the note taking participant is to perform at some point after a meeting has ended. In absence of these notes, participants often forget important meeting details and/or inadvertently forget one or more actions that they intended to take.

Virtual meetings and/or quick text exchanges (e.g., text messaging, Instant Messaging, chatting, etc.) are often used as inexpensive substitutes for holding physical meetings. Through text exchanges, group members are able to communicate in real-time with each other. This ability can be used to rapidly resolve many situations, which often negates a need for conducting physical meetings.

In another example, a computer specialist can help a distressed computer user, by texting a solution to the user's problem via a text-exchange session. Convenient as text exchange sessions may be, participants often forget to take follow-up actions discussed in a text exchange session. One reason for this absentmindedness is that no capability exists within conventional text exchange interfaces for adding notes which are stored for the user's reference and use yet which are not conveyed to remote communicators.

SUMMARY OF THE INVENTION

The present invention discloses a solution for adding personal note capabilities to text exchange clients. For example, a user can type a message within a text exchange interface that is prefaced by a special symbol which informs the text exchange application that a note follows. Personal notes can be for internal use and can be stored along with a text exchange communication log. The personal notes can be indexed to make searching through a set of text exchange transcripts associated with text exchange communications easier. Personal notes can also be data mined by an analysis program and automatic programmatic actions can be initiated based on the notes.

For instance, a user can add a calendar entry note which can initiate a programmatic action that adds content in the calendar note to create a related entry in a scheduling application. In one embodiment, when two communicators are using a personal note capable client, personal notes can be conveyed from one communicator to another during a text exchange session. The conveyed personal notes will behave in a similar fashion to notes created by a client user, with the exception of being conveyed across a network.

The present invention can be implemented in accordance with numerous aspects consistent with the material presented hereto, for example, one aspect of the present invention can include a text exchange application having a capability to create personal notes during a text exchange session. The personal notes can contain user entered text that is not transmitted as part of a text exchange dialog to a remote communication participant of the text exchange session. Personal notes can, however, be transmitted in a communication outside the text exchange dialog.

Another aspect of the present invention can include a text exchange interface capable of displaying and creating personal notes. The interface can include an input region, an output region, a graphical user interface (GUI) element for entering personal notes, and a GUI region for viewing personal notes. The input region can be used for entering text that is to be conveyed to participants of a text exchange session. The input region can include the GUI element for entering personal notes. The output region can permit text exchange dialog exchanged during the text exchange session to be viewed. The output region can include the GUI region for viewing personal notes.

Still another aspect of the present invention can include a method for annotating text exchange communications. The method can include a step of identifying a text exchange session involving at least two communication participants. At least one of the communication participants can utilize a text exchange application having personal note capabilities. At least one personal note can be created based upon user input entered into the text exchange application. A session log can be generated for the text exchange session. The log can include the text exchange dialog as well as the personal notes. The personal note can be used for indexing, searching, and otherwise managing the log. The personal notes are not part of the dialog exchanged between participants.

It should be noted that various aspects of the invention can be implemented as a program for controlling computing equipment to implement the functions described herein, or as a program for enabling computing equipment to perform processes corresponding to the steps disclosed herein. This program may be provided by storing the program in a magnetic disk, an optical disk, a semiconductor memory, or any other recording medium. The program can also be provided as a digitally encoded signal conveyed via a carrier wave. The described program can be a single program or can be implemented as multiple subprograms, each of which interact within a single computing device or interact in a distributed fashion across a network space.

It should also be noted that the methods detailed herein can also be methods performed at least in part by a service agent and/or a machine manipulated by a service agent in response to a service request.

BRIEF DESCRIPTION OF THE DRAWINGS

There are shown in the drawings, embodiments which are presently preferred, it being understood, however, that the invention is not limited to the precise arrangements and instrumentalities shown.

DETAILED DESCRIPTION OF THE INVENTION

Figure 1:
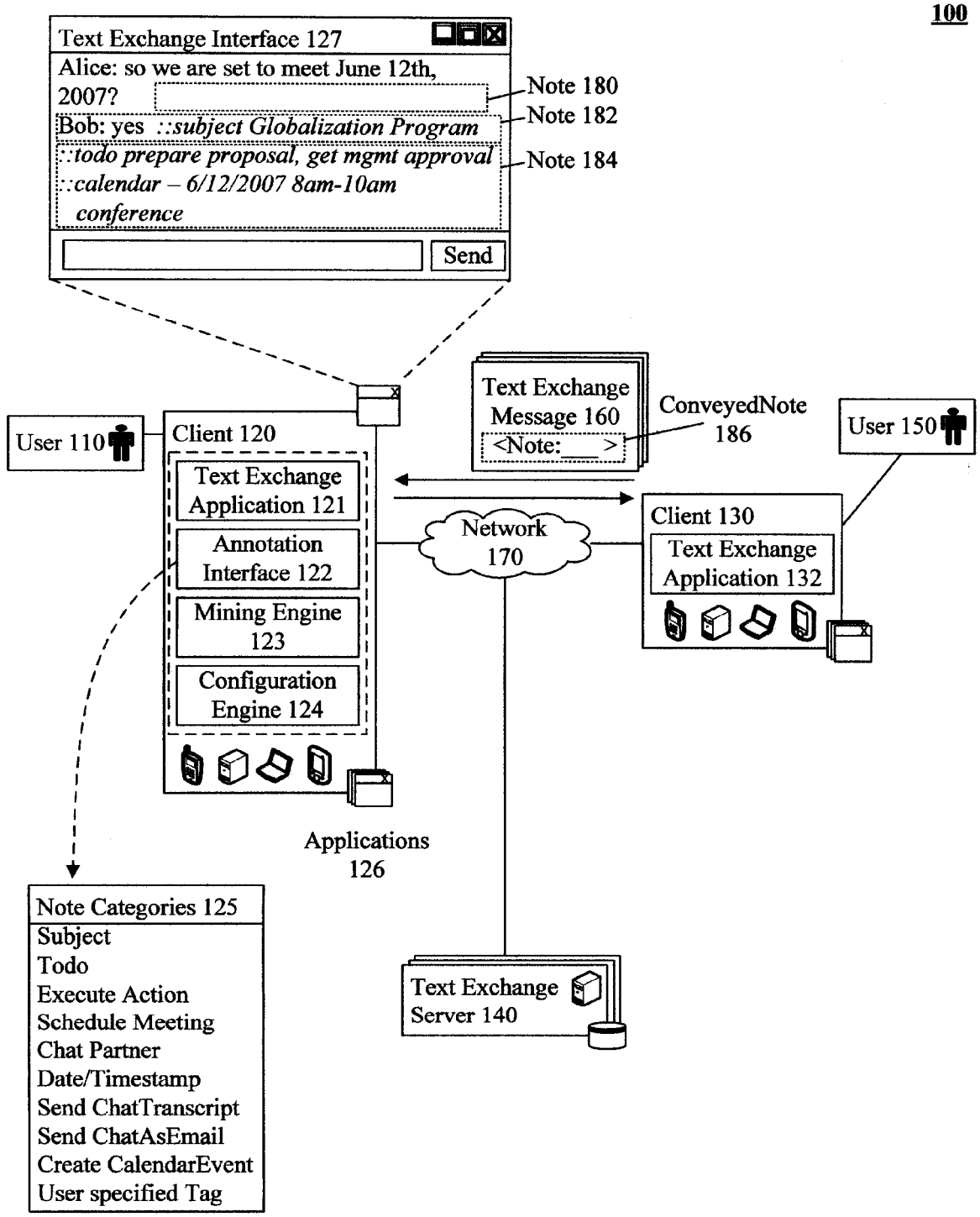
FIG. 1 is a schematic diagram illustrating a system where personal note capabilities have been added to text exchange clients in accordance with an embodiment of inventive arrangements disclosed herein.

FIG. 1 is a schematic diagram illustrating a system 100 where personal note capabilities have been added to text exchange clients in accordance with an embodiment of inventive arrangements disclosed herein. System 100 illustrates users 110, 150 engaged in a text exchange communication, where at least one of the clients (120, 130) utilized by the users (110, 150) possesses personal note capabilities. As used herein, text exchange refers to any real-time, interactive, text based communication mechanism, such as chatting, instant messaging, text messaging, and the like. Text exchange communications for purposes of system 100 can include content in addition to text, such as audio, video, pictures, Web links, file exchanges, and the like. A text exchange communication can be a peer-to-peer communication between clients 120 and 130 or can be a communication facilitated by text exchange server 140. Any type of communication, which includes an exchange of text between two or more users 110, 150 can be considered a text exchange communication for purposes of system 100.

Personal notes 180-186 can be internal use comments or annotations made by a text exchange user 110 for indicating important information in a text exchange. By default, personal notes 180-184 are local to a user 110 and are not to be transmitted to a communication participant 150, Instead, the personal notes 180-184 are stored and/or indexed within client 120. A user 110 accessing a text exchange log or history can view his/her notes 180-184 and can use keywords contained within notes to search for a related text exchange communication. In one embodiment, notes 180-184 can be programmatically linked to one or more local applications 126, For example, a to-do note 182 can be linked to a task management application 126 so that new entries in the task management application 126 are automatically created based upon the to-do note 182 being entered in interface 127.

A special category of personal note 186 can exist for notes 186, which are to be conveyed to a remote user 150. These personal notes 186 can be conveyed outside a normal text exchange dialog and can be handled by a receiving client 130 in a manner similar to user 150 initiated notes. For example, user 110 can opt to send via note 186 a note that includes meeting times for the conference to user 150. Conveyed notes 186 can be conveyed in any manner, such as by using special markup tags of message 160. In another instance, the conveyed note 186 can be sent by email, which may be easily consumed by client 130. Further, the conveyed note 186 can be an annotation appearing within the dialog of a text exchange interface of user 150, which is referenced by a special symbol or indicator, which distinguishes it from normal text exchange content.

In one embodiment, a personal note 180-186 can be identified by a special symbol that is prefixed to a comment made by a user. As shown in system 100, personal notes 180-186 can be defined using a special symbol of two colons prefixed to a special keyword or category 125, For example, in text exchange interface 127, Bob can make several personal notes 180-184, indicated by ::subject, ::todo, and ::calendar for personal use. Symbols and note categories 125 can be user or system specified and can be user 110 extensible. It should be appreciated that use of a special symbol to indicate that a personal note 180-186 follows is a convention used for just one embodiment of the invention and that others are contemplated. For example, hot-key combinations, selectable icons, popup options, and the like can all be used to indicate that a text segment is to be handled by text exchange application 121 as a personal note 180-186.

Sample categories 125 can include a subject category, a to-do category, an execute action category, a schedule meeting category, a chat partner category, a date/timestamp category, a send chat transcript category, a send chat-as-email category, a create calendar event category, a user specified tag category, and the like.

Client 120 and 130 can be communication devices capable of text exchange communications. Client 120 and 130 can be a desktop computer, laptop, personal digital assistant (PDA), mobile phone, portable gaming system, and the like. Client 120 and 130 can execute software that receives, transmits and processes text exchange communication. Client 110 and 130 can each include a text exchange application 121, 132.

Each text exchange application 121 and 132 can be a software program used to facilitate text exchange between one or more parties. Text exchange application 121 can present text exchange interface 127, allowing a user 110 to send and receive text exchange communications. Text exchange application 121 can be associated with an annotation interface 122, mining engine 123, and configuration engine 124. Engines 122-124 can cause text exchange application 121 to become personal note aware and capable of managing personal notes made by a user 110. For example, text exchange interface 127 illustrates a user, Bob, using personal notes in the text exchange, which can be situationally transmitted to Alice.

Annotation interface 122 can include a graphical user interface (GUI) in a text exchange application 121 presented to assist a user with the creation and management of personal notes in text exchanges. Annotation interface 122 can be presented in a variety of ways including pop-up windows, program menu entries, graphical toolbars, and the like. Annotation interface 122 can be configured to recognize note categories 125, which can include categories such as subject, to-do, execute action and the like. Annotation interface 122 can be assisted by mining engine 123 to present personal notes in a text exchange.

Mining engine 123 can include a software program used to identify personal notes in text communication. In one embodiment, a mining engine 123 can function in cooperation with an operating system file manager to readily present personal note data contained in a text exchange log. Personal note data can be presented in a mouse tool tip field, description field in the file manager, and the like.

Configuration engine 124 can include a GUI that determines the manner in which personal notes can be managed. Configuration engine 124 can include configuration settings for file system visibility for personal notes. Other configuration settings can include creation and management of personal note categories. Further settings can include the cosmetic presentation of personal notes in text exchanges.

As shown herein, network 170 can include any hardware/software/and firmware necessary to convey digital content encoded within carrier waves. Content can be contained within analog or digital signals and conveyed through data or voice channels and can be conveyed over a personal area network (PAN) or a wide area network (WAN). The network can include local components and data pathways necessary for communications to be exchanged among computing device components and between integrated device components and peripheral devices. The network can also Include network equipment, such as routers, data lines, hubs, and intermediary servers which together form a packet-based network, such as the Internet or an intranet. The network can further include circuit-based communication components and mobile communication components, such as telephony switches, modems, cellular communication towers, and the like. The network can include line based and/or wireless communication pathways.

Figure 2:
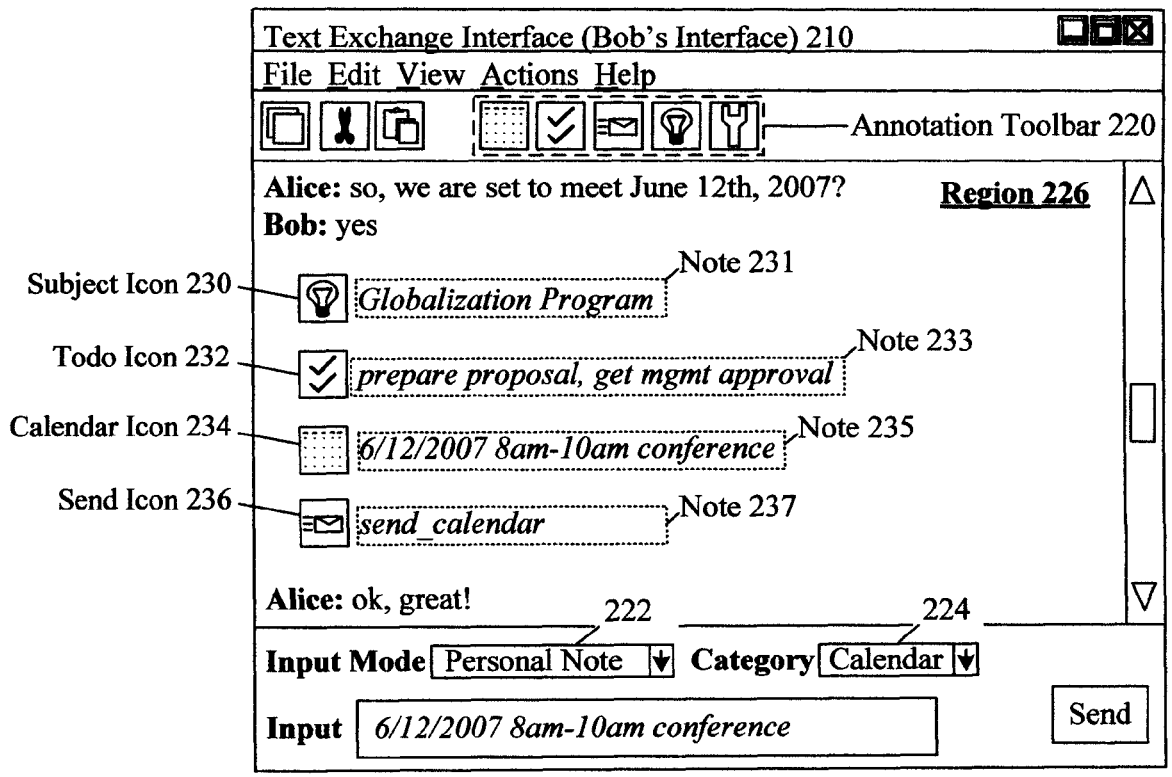
FIG. 2 is a schematic diagram illustrating a set of graphical user interlaces (GUIs) for personal note equipped text exchange clients in accordance with an embodiment of inventive arrangements disclosed herein.
Figure 2:
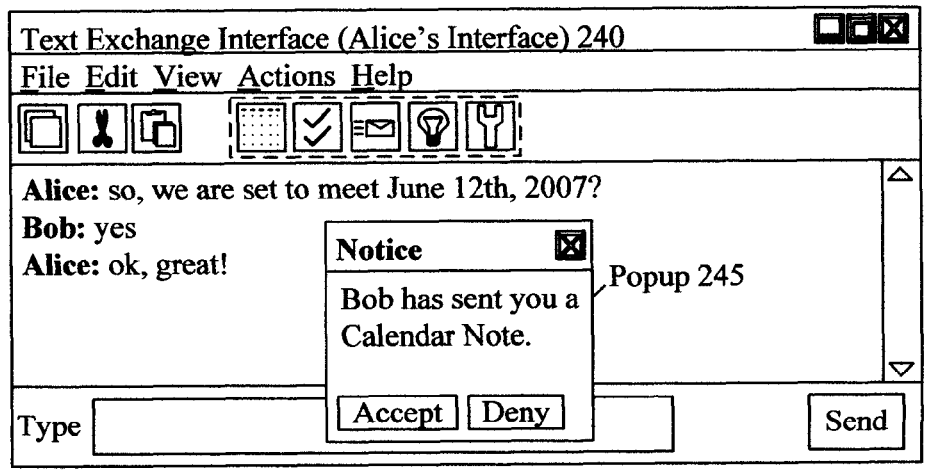

FIG. 2 is a schematic diagram illustrating a set of graphical user interfaces (GUIs) 200 for personal note equipped text exchange clients in accordance with an embodiment of inventive arrangements disclosed herein. Actions associated with GUIs 200 can be performed in the context of system 100. GUIs 200 illustrate a text exchange between two users. Bob and Alice, where interface 210 is Bob's interface and interface 240 is Alice's interface.

A series of personal notes 231, 233, 235, 237 can be entered in interface 210. For example, a user can set an input mode 222 for personal notes, can select calendar as a note category 224, and can type in the calendar note to create note 235. Once a note 231, 233, 235, 237 has been created, it can be displayed in interlace 210 along with option icons 230, 232, 234, 236, which visually indicate a category of the presented note. A user searching a stored text exchange communication log can easily identify subject changes in the communication stream through the use of the icons 230, 232, 234, 236, It should be appreciated that use of mode 222 and category 224 selectors are only one way to implement a feature that adds personal notes and that the invention is not to be construed as limited in this regard.

For example, annotation toolbar 220 can include an interactive graphical toolbar for creating and managing personal notes in a text exchange. Annotation toolbar 220 can include functions such as creating a calendar event to-do note, subject personal note and the like. For example, a user can create a schedule event note by clicking on the appropriate icon in the annotation toolbar 220. In one embodiment, a user can be prompted for event name, time and date information in a dialog box when attempting to make a scheduled event note. In another implementation, personal notes can be directly typed into a dialog presentation region 226. Hot-key combinations, menu options, and other interface artifacts can also be used in various contemplated implementations for personal note entry purposes.

When a user enters a personal note 237 that is to be conveyed, a notice 245 can be presented to a note recipient in interface 240, who can opt to accept or deny the incoming note 237. Other personal notes 231, 233, 235 are not transmitted and are for local use only. It should be noted that none of these notes 231, 233, 235 appear in interface 240 or are even conveyed to a client upon which interface 240 resides.

Figure 3:
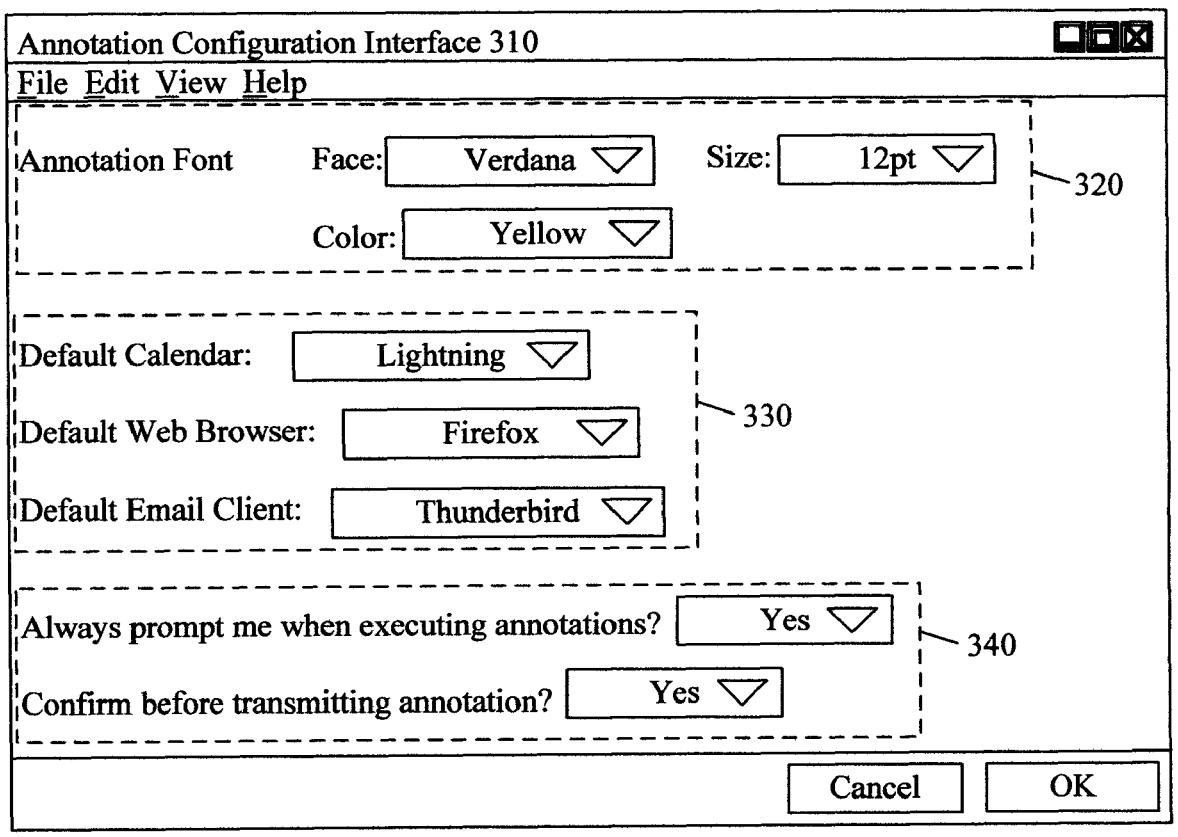
FIG. 3 is a schematic diagram illustrating a GUI for configuring personal note settings of a text exchange client in accordance with an embodiment of inventive arrangements disclosed herein.

FIG. 3 is a schematic diagram illustrating a GUI 300 for configuring personal note settings of a text exchange client in accordance with an embodiment of inventive arrangements disclosed herein. Actions associated with GUI 300 can be performed in the context of system 100. GUI 300 can include the configuration settings such as cosmetic presentation of annotations, default applications, and annotation behavior within the text exchange client.

Annotation configuration interface 310 can allow for the configuration of personal notes in the text exchange client Configuration interface 310 can be accessed from annotation toolbar 220. Configuration can be achieved through drop-down selections, check boxes, radio buttons, and the like.

Section 320 can include configuration settings associated with the visual presentation of personal notes. For example, font configuration such as font face, color and point size can be manipulated. Section 320 can also manage/configure a set of graphical artifacts associated with specific personal note categories.

Personal notes in text exchanges can have actions associated with external applications. In section 330, default applications can be configured for specific actions associated with personal note categories. For example, the default email client can be set for personal notes that can require an email program to execute.

In section 340, behavior of personal notes that have actions can be configured. In one embodiment, a configuration parameter for prompting a user to allow a personal note to perform an action can be envisioned. Transmission of personal notes can also be configured to prompt a user before transmission occurs.

Figure 4:
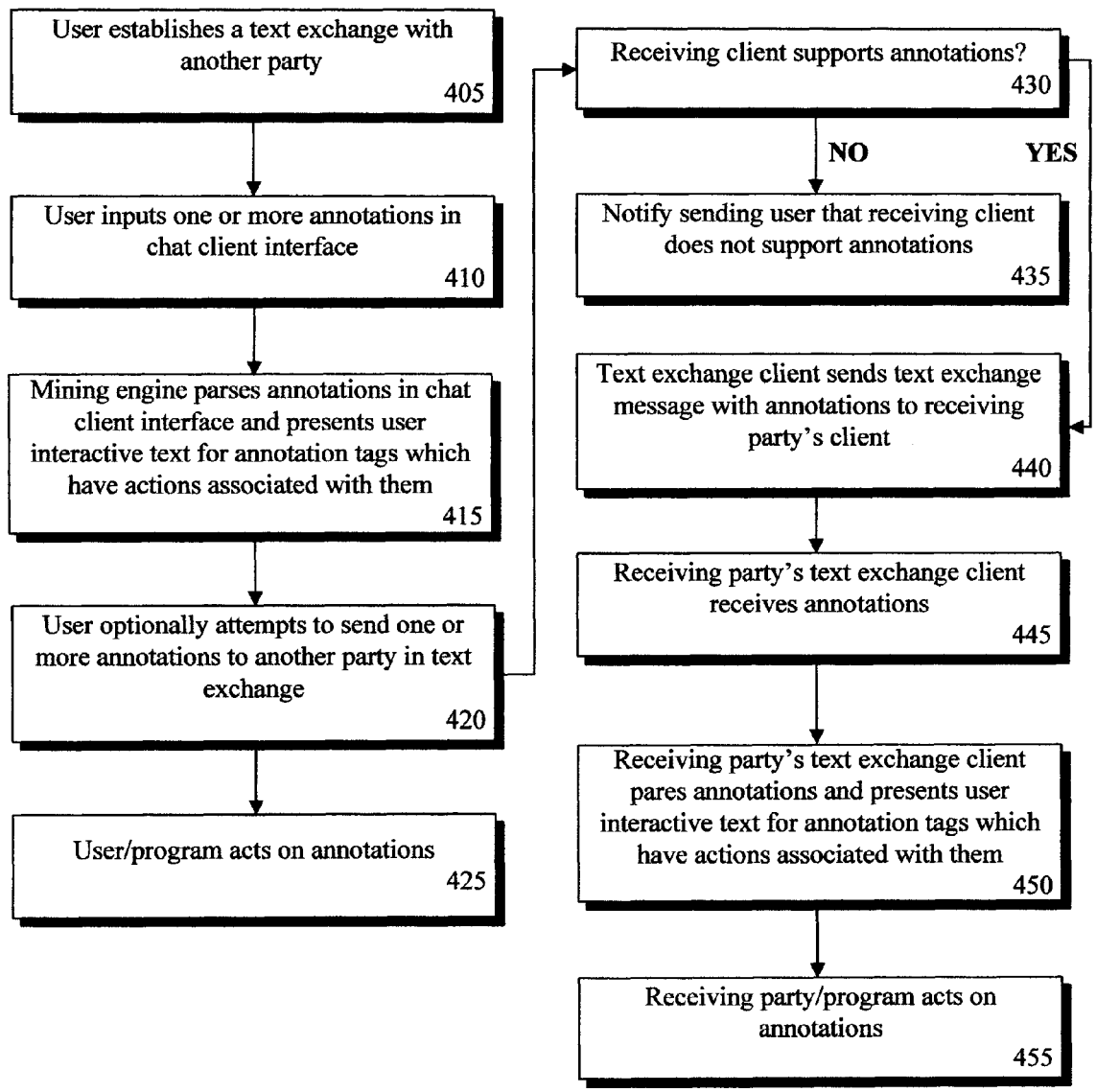
FIG. 4 is a flowchart diagram illustrating a method for using personal note capabilities of a text exchange clients in accordance with the embodiment of inventive arrangements disclosed herein.

FIG. 4 is a flowchart diagram illustrating a method 400 for using personal note capabilities of a text exchange clients in accordance with the embodiment of inventive arrangements disclosed herein. Method 400 can be performed in the context of system 100. In method 400, a user engaged in a text exchange can make personal notes for internal use. A text exchange user can also situationally transmit personal notes to another text exchange user.

The method can begin in step 405 where a user can establish a text exchange with another party. During the course of a text exchange, a user can input one or more annotations, or personal notes. In the chat client interface as illustrated in step 410. A mining engine component associated with a text exchange client can detect and parse annotations in the chat client interface. As shown in step 415, a mining engine can present a user with interactive text and graphical artifacts associated with annotations.

In step 420, a user can optionally send one or more annotations to another party engaged in the text exchange. By default, personal notes can be for private use only and will not be transmitted to others unless the notes belong to a special category of notes specially designed to be conveyed to others. If the user chooses not to transmit the text annotations, the method can end in step 425, where the user and/or an automated program performs actions on stored annotations.

If the user attempts to transmit the personal note to another user in the text exchange, the method can proceed from step 420 to step 430. In step 430, the sending client can determine if the receiving client supports annotations. When a receiving client does not support personal notes, the sending text exchange client can notify the sending user that transmission cannot occur, as illustrated by step 435. If a receiving client is personal note aware, however, the method can proceed to step 440 where the sending text exchange client can send the annotations to the receiving client in a text exchange or other message.

In step 445, a receiving party's text exchange client can receive a text exchange message containing annotations. As shown in step 450, the receiving party's text exchange client can parse and present the annotations to the receiving user. Interactive text and graphical artifacts can be presented to the receiving user depending upon user established personal note settings. Once a user has received the annotation, the receiving user or an automated program residing on a receiving client can optionally act on the annotations, as shown in step 455. For example, a user/program receiving a scheduled event can add the event to a personal calendar.

The present invention may be realized in hardware, software or a combination of hardware and software. The present invention may be realized in a centralized fashion in one computer system or in a distributed fashion where different elements are spread across several interconnected computer systems. Any kind of computer system or other apparatus adapted for a carrying out methods described herein is suited. A typical combination of hardware and software may be a general purpose computer system with a computer program that, when being loaded and executed, controls the computer system such that it carries out the methods described herein.

The present invention also may be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

This invention may be embodied in other forms without departing from the spirit or essential attributes thereof. Accordingly, reference should be made to the following claims, rather than foregoing the specification, as indicating the scope of the invention.

What is claimed is:

1. An instant messaging (IM) application stored on a non-transitory machine readable storage medium comprising:
   a capability to create personal notes during an instant messaging (IM) communication session that is a real-time interactive text based communications, wherein said personal notes contain user entered text that is not transmitted as part of an instant messaging dialog to a remote communication participant of the instant messaging session; and
   an instant messaging (IM) graphical user interface of the instant messaging application comprising:
   a common input region for entering text that is conveyed to participants during the instant messaging (IM) session and for entering personal notes that are not conveyed to the participants over a network during the instant messaging session,
   wherein personal notes are distinguished by the instant messaging (IM) application as each personal note is preceded by a reserved set of textual characters that indicate that subsequent content is a personal note and not text that is to be conveyed to the participants over the network: and
   an output region for viewing the instant messaging dialog exchanged during the instant messaging session, wherein said personal notes entered by a user able to view the personal notes that is also the user that entered the personal notes are also presented within the output region.

2. The application of claim 1, wherein the user entered text for the personal notes is input to the input region and is transmitted to the remote participant using markup tags specially associated with personal note transmissions.

3. The application of claim 1, wherein at least a portion of the personal notes are also commands that trigger client-side actions to be taken by at least one client-side application other than the instant messaging application.

4. The application of claim 1, wherein the personal notes are stored along with exchanged content of the instant messaging session within a session log.

5. The application of claim 4, wherein a component of the instant messaging application responsive for viewing session logs permits searching of session logs based upon content contained in the stored personal notes.

6. The application of claim 1, further comprising: a note mining engine configured to automatically detect an existence of personal notes and to take at least one programmatic action responsive to note detection, wherein said at least one programmatic action comprises adding a calendar entry to a calendar program when the personal note is a calendar note, wherein specifics of said calendar entry are determined from content of the personal note, and wherein said at least one programmatic action comprise adding a task to a task management application when the personal note is a to-do note, wherein specifics of the task are determined from content of the to-do note.

7. The application of claim 6, wherein the programmatic action instantiates a locally executing application associated with a category of personal notes, wherein said instantiated application comprises at least one of an email application, a calendaring application, a task management application, and a scheduling application.

8. The application of claim 6, wherein the programmatic action automatically creates a new electronic document having content specified by the personal note that triggered the programmatic action, and wherein said electronic document comprises at least one of an email message, a calendar entry, a to-do entry, and a meeting entry.

9. The application of claim 1, wherein the personal note causes a content of the instant messaging session displayed in the output region to be conveyed via an email application to another, wherein the email application is independent of the instant messaging application.

10. The method of claim 1, wherein the input region is also for entering the personal notes relating to the instant messaging session.

11. The method of claim 10, wherein a special symbol of a set of characters is typed to distinguish user entered personal notes from user entered text that is to be part of the instant messaging dialog, said special set of symbols prefaces the user entered text both of which are typed in the input section of the instant messaging interface.

12. The method of claim 1, wherein the input region is also for entering the personal notes relating to the instant messaging session, and wherein at least one of the personal notes input via the input region is conveyed to the remote communication participant as part of an email message sent to said remote communication participant.

13. The method of claim 1, said instant messaging graphical user interface further comprising a plurality of user selectable buttons for creating and managing personal notes, said plurality of user selectable buttons comprising one button for creating a calendar event as a personal note, one button for creating a to-do note as a personal note, and one button for sending a personal note to the remote communication participant.

14. The method of claim 1, wherein each of the personal notes is associated with a note category, and wherein said graphical user interface region visually displays a category indicator proximate to a related personal note in the output region.

15. The method of claim 14, wherein the note categories include at least four of the following: a subject category, a to-do category, an execute action category, a schedule meeting category, a chat partner category, a date/timestamp category, a send chat transcript category, a send chat-as-email category, and a create calendar event category.

16. A method for annotating instant messaging text exchange communications comprising:
   identifying an instant messaging session involving at least two communication participants, wherein at least one of the communication participants utilizes an instant messaging application having personal note capabilities, said instant messaging application comprising an instant messaging graphical user interface, said instant messaging graphical user interface comprising:
   an input region for entering text that is conveyed to participants during the instant messaging session and for entering personal notes that are not conveyed to the participants during the instant messaging session; wherein the input region is also the GUI element for entering personal notes, and wherein a special symbol of a set of characters is typed to distinguish user entered personal notes from user entered text that is to be part of the instant messaging dialog, said special set of symbols prefaces the user entered text both of which are typed in the input section of the instant messaging interface;

an output region for viewing the instant messaging dialog exchanged during the instant messaging session, wherein said personal notes are also presented within the output region; and a graphical user interface (GUI) element for entering personal notes relating to the instant messaging session;

creating at least one personal note based upon user input entered into the instant messaging application, wherein the personal note is entered into the graphical user interface (GUI) element as text; and generating a session log of the instant messaging text exchange session, wherein said log comprises the instant messaging dialog exchanged between the communication participants as well as the created personal note, wherein the personal note contains user entered text that is not transmitted as part of the instant messaging dialog of the instant messaging session.

17. The method of claim 16, wherein the input region is also the GUI element for entering personal notes further comprising: displaying the personal note in an interface associated with the instant messaging application, wherein the personal note is not conveyed to remotely located ones of the communication participants.

18. The method of claim 16, further comprising: conveying the personal note to a remotely located one of the communication participants via an application other than the instant messaging application in accordance with a command established by the personal note;

presenting a notice via an application external to an instant messaging application used by the participant regarding the incoming personal note to the remotely located communication participant, said notice including an option to accept and an option to reject the incoming personal note; and selectively accepting the conveyance of the personal note depending upon which option the remotely located communication participant chooses.

19. The method of claim 16, wherein said steps of claim 16 are steps performed automatically by at least one machine in accordance with at least one computer program having a plurality of code sections that are executable by the at least one machine, said at least one computer program being stored in a non-transitory machine readable medium.

* * * * *